Nov. 6, 1962 J. BOUDAN 3,062,408
APPARATUS FOR FEEDING MATERIALS AT A REGULATED RATE
Filed Aug. 1, 1960 2 Sheets-Sheet 2
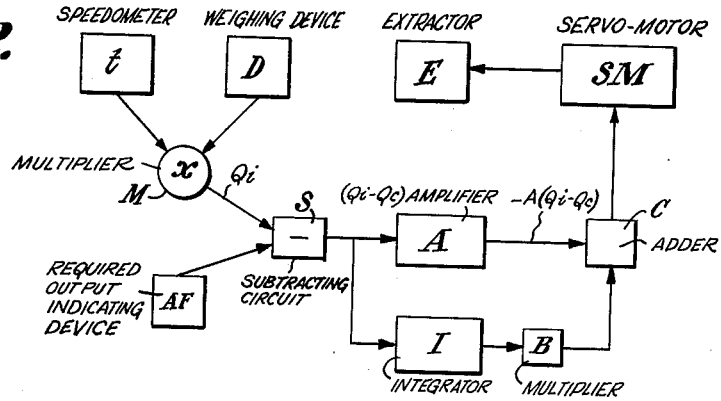
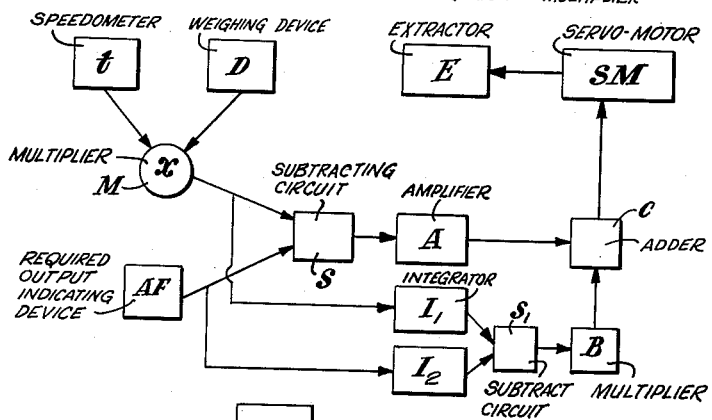
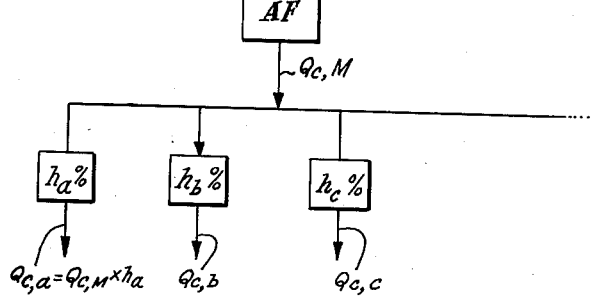
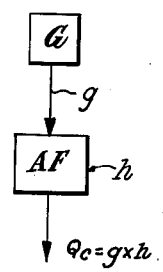
INVENTOR
Jacques Boudan
BY
Mason, Fenwick & Lawrence
ATTORNEYS

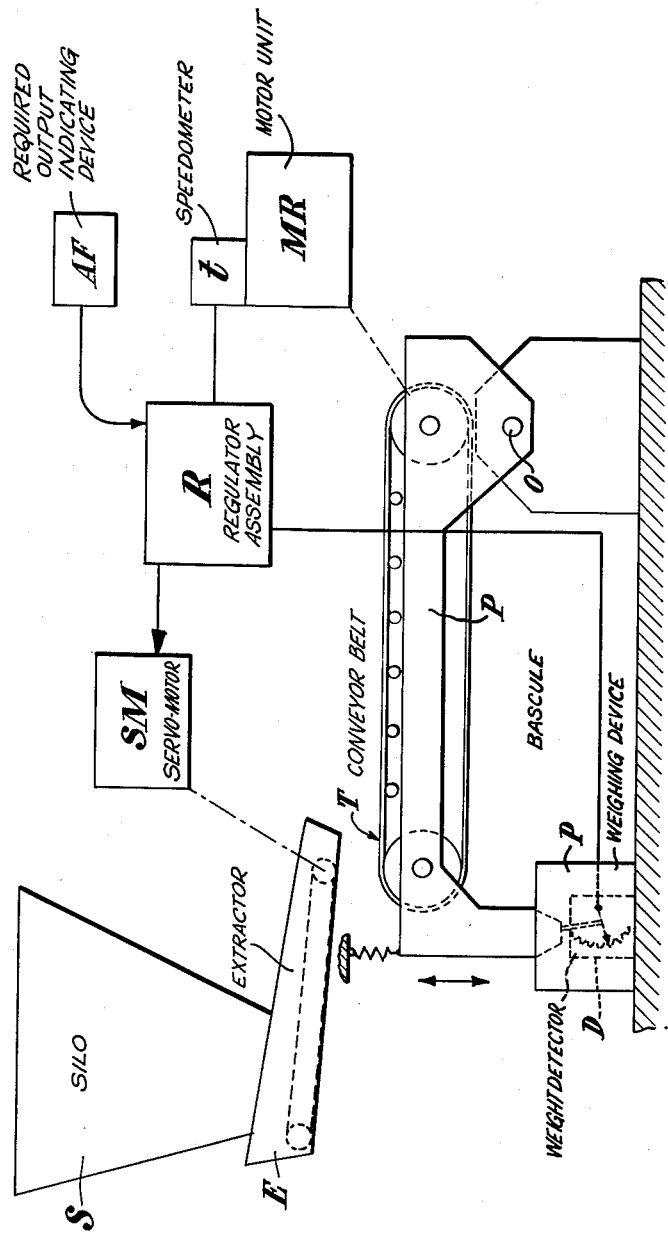

United States Patent Office 3,062,408
Patented Nov. 6, 1962

3,062,408
APPARATUS FOR FEEDING MATERIALS
AT A REGULATED RATE
Jacques Boudan, Enghien les Bains, France, assignor of one-half to Societe Anonyme: Societe Grenobloise d'Etudes & d'Applications Hydrauliques Sogreah, Grenoble, France
Filed Aug. 1, 1960, Ser. No. 46,830
Claims priority, application France Mar. 29, 1960
4 Claims. (Cl. 222—55)

The present invention relates to feeder devices for pulverulent or granular materials of the type comprising a silo for the storage of the materials, an extractor and a continuous conveyor for example of the belt type which is mounted on a weighing device.

These plants are currently used for effecting a control of the output of the materials.

In practice, it is accepted that the force applied by the conveyor to the weighing device multiplied by the velocity of the conveyor is a function of the output. Thus, in the plants hitherto known, the weight of a layer of material on the conveyor may be adjusted, by controlling the extractor, at a value determined for a constant value of the velocity of the conveyor. One may likewise adjust the velocity of the conveyor to a value predetermined for a constant value of the weight of the layer of material. One may even combine these two methods of control. In any case, the product of the weight of the layer and the velocity of the conveyor remains at any moment equal to a fixed value of the output, called the "design value."

Now, the output is by definition the real weight of the material passing in unit time through a given section. Consequently, the product defined hereinabove is not strictly a univocal function of the output since the manner of distribution of the materials on the conveyor is necessarily more or less irregular owing to irregularities of the extraction and the heterogeneity of the materials.

Thus, for the reasons explained hereinabove, the feeder plants of pulverulent or granular materials only allow the approximate control of the actual instantaneous output to a predetermined design value.

It must be noted that the object aimed at by the user does not in fact consist in obtaining a real instantaneous output of a given, for example constant, value, but in obtaining a mean output of a given value, or in other words, a real weight of material delivered during a certain period having a given value.

The present invention concerns particularly a feeder plant for pulverulent or granular materials designed to facilitate the control of the real weight of material delivered during a given period to a predetermined design value.

The invention is based on the explanation given by the inventor, that, although the product at a given moment of the force applied by the conveyor loaded with material to the weighing device and the velocity of the conveyor is not a univocal function of the actual instantaneous output, the integral with respect to time of this product is a univocal function of the actual weight delivered by the conveyor.

Accordingly, the present invention has in general the object of providing a process for the feeding of pulverulent or granular materials consisting substantially in measuring the force applied by an endless conveyor loaded with material to a measuring device, measuring the velocity of forward movement of this conveyor, obtaining an integral with respect to time of the product of the said force and the said velocity, and adjusting the value of the quantities of the materials deposited on the conveyor and/or the velocity of the conveyor as a function of this integral in such a manner that the value of the said integral is equal to a design value of weight.

The invention has also the object of providing a feeder plant for pulverulent or granular materials for carrying into practice the process defined hereinabove.

Such an installation comprises a silo for the storage of the material, an extractor for the said material, an endless conveyor which is coupled to a weighing device and on which the said extractor deposits the material, means for driving the said conveyor, a device for measuring the force applied by the said conveyor to the weighing device, a device for measuring the linear velocity of the conveyor, a device for displaying the required design value of the instantaneous output, and a servomotor acting on the said extractor and/or the said driving means of the conveyor, the installation being further characterised in that it comprises in combination, on the one hand, means for multiplying the instantaneous value of the quantities of material deposited on the conveyor by the instantaneous value of the linear velocity of the conveyor means, means for obtaining the difference between the product thus obtained and the design value of the instantaneous ouput, means for applying the difference thus obtained to the input of a low gain amplifier in such a manner as to generate a first control signal, and, on the other hand, means for issuing the integral with respect to time of the said difference and for multiplying this integral by a constant factor in such a manner as to deliver a second control signal, the said servomotor being controlled by a signal which is the sum of the said first and second control signals.

The theory of servo-mechanisms shows that a manner of control of the servo-motor by which one uses a direct control signal as a function of the difference between the instantaneous values of measurement and the design value, and a second control signal as a function of the difference between the measurement and design of values of the weight passed on the conveyor, may be stable.

A plant according to the invention may be used for the regular feeding of materials to processing appliances such as washing appliances, kneading appliances, crushing appliances, sifting appliances, drying appliances, etc. The regular feeding of materials to those appliances at their nominal rates throughout, increases at the same time the mean output of the appliances and the quality of their operation, by eliminating both idling and overloading.

One may also use simultaneously several plants according to the invention for effecting the metering of the different constituents of mixtures of solid products, whether pulverulent or granular.

One may thus maintain a strict percentage of each constituent in the mixtures as required. One thus attains a constant output, increasing the quality and reducing the cost price by the optimum use of costly materials and by the regularity of feeding of appliances. This regularity allows an increase in the daily tonnage which can be treated.

After the general statement of invention given hereinabove, it will be readily realised that, for carrying it into effect, one has a rather wide choice for the actual organisation of each functional assembly as well as for the technological realisation of the elements used in these assemblies.

By way of particular examples, some possible embodiments of the invention will now be described with reference to the accompanying drawing, in which:

FIGURE 1 diagrammatically illustrates the different functional assemblies of a plant according to the invention, FIGURE 2 illustrates in more detail one embodiment of a functional scheme, FIGURE 3 is a scheme technically equivalent to the scheme according to FIGURE 2, and FIGURES 4 and 5 are partial schemes of further modifications.

FIGURE 1 shows a plant for the feeding of a pulverulent or granular material stored in a silo S. An extractor E, of characteristics appropriate to the material, draws the same off in a controllable manner by means of a servo-motor SM, in order to discharge the material into a conveyor belt T having characteristics likewise adapted to the material in consideration and driven by a motor-reduction gearing unit MR. The extractor E may be of any of the commercially available types, such for example as the servo-motor regulated endless belt extractors disclosed in French Patent No. 1,046,076 dated December 3, 1953, Patent No. 1,091,644 dated April 13, 1955, Patent No. 1,164,809 dated October 14, 1958 and Patent No. 1,217,384 dated May 3, 1960. A speedometer instrument $t$ supplies a measurement of the linear velocity of the belt.

The belt T is mounted on a bascule comprising a table having rigid beams $p$ pivotally mounted on an axle $o$. The other end of the table acts on a weighing device P comprising a detector device D of a convenient type capable of delivering a signal, such as an electrical voltage, dependent on the force applied to the bascule by the conveyor belt T and the material carried thereon. The detector device D of the weighing device P may be of any conventional type, such, for example, as the types illustrated in the aforementioned French patents wherein the wiper arm of a potentiometer is mechanically adjusted responsive to weight variations in material on a conveyor belt to provide output voltages related to the weight variations.

An indicating device AF is also provided on which the operator sets the required value of the instantaneous output of materials to be extracted from the silo S, said output being either constant or programmed.

The signals delivered by the detector D, the speedometer instrument $t$ and the indicating instrument AF are applied to the input of a regulator assembly R functioning in accordance with the invention and issuing a control signal to the servo-motor SM.

It will be remarked that instead of providing a detector such as D which measures the force resulting from the weight of the material present on the belt T of controlling the servo-motor SM in accordance with the force thus measured, such control may be derived from the measurement of any parameter tied to the quantities of materials discharged on the belt, for example, the rate of radio-activity of radioactive material or the magnetic characteristics of magnetic materials.

Reference will now be made to FIGURE 2 for analysing in detail the various functional elements contained in the regulator assembly R.

The signals delivered by the speedometer instrument $t$ and the detector D of the weighing device are applied to the input of a multiplier circuit $m$ the output signal $Q_i$ of which is approximately a function of the instantaneous output of material on the conveyor belt.

A subtracting circuit $s$ produces a signal $(Q_i - Q_c)$ in which $Q_c$ is the design value of the instantaneous output as introduced into the indicating device AF.

The signal $(Q_i - Q_c)$ is applied to the input of a low gain amplifier A which produces a signal $-A(Q_i - Q_c)$.

The signal $(Q_i - Q_c)$ is also applied to the input of an integrating circuit I which produces a signal $$-\int_{t_o}^{t}(Q_i - Q_c).dt$$

which is subsequently multiplied by the factor B.

The signals $-A(Q_i - Q_c)$ and $$-B\int_{t_o}^{t}(Q_i - Q_c)dt$$

are finally summed in adding means C. The resulting signal $$\left[-A(Q_i - Q_c) - B\int_{t_o}^{t}(Q_i - Q_c).dt\right]$$

controls the functioning of the servo-motor SM, the latter actuating the extractor E.

The scheme according to FIGURE 3 differes from that according to FIGURE 2 only in that the signals $Q_i$ and $Q_c$ are integrated separately in the integrators $I_1$ and $I_2$ before being subtracted in the subtracting circuit $s_1$.

The scheme according to FIGURE 4 corresponds to the case in which several conveyor belts are used for effecting the metered feeding of different constituents of a mixture. Several regulator assemblies such as the regulator R are used in parallel, one regulator being allocated to each constituent of the mixture.

The design value $Q_{c,a}$ for a particular regulator corresponding to a constituent $a$ is obtained by deriving the product of the general design value of the output of the mixture $Q_{c,M}$ and a design value in the percentage $h_a$ of the constituent $a$ in relation to the mixture, such that $Q_{c,a} = Q_{c,M} \times h_a$. The different values of $Q_{c,a}$; $Q_{c,b}$; $Q_{c,c}$ etc. . . . thus obtained are then treated in the different regulator assemblies such as the assembly R in a manner similar to that illustrated in the FIGURES 2 or 3.

The scheme of FIGURE 5 corresponds to the case in which the output of the extractor E is to be controlled by a physical magnitude $g$, such as the rate of radio-activity as previously mentioned the value of which is measured by a device G. The device $A_f$ indicates the percentage $h$. In these conditions, the design value $Q_c$ is equal to $g \times h$.

What I claim is:

1. Apparatus for feeding materials at a regulated rate, comprising a moving conveyor, means responsive to variations in the weight of material on the conveyor for producing first signals bearing a preselected relation to the instantaneous weight of materials on the conveyor, means responsive to the linear velocity of the conveyor for producing second signals representative of the instantaneous linear velocity of the conveyor, means for generating third signals continuously representing selected instantaneous material output values, multiplying means responsive to said first signals and second signals for generating output signals representing the product of the instantaneous values of said first signals and second signals, subtracting means responsive to the signals generated by said multiplying means and to said third signals for generating difference signals representing the difference between the same, amplifier means responsive to said difference signals for producing a first control signal, integrating means responsive to said difference signals for integrating the same with respect to time, multiplier means responsive to output signals from said integrating means for multiplying the same by a constant factor and generating a second control signal responsive thereto, and means responsive to said first and second control signals for producing output signals representing a function of both said first and second control signals for regulating delivery of materials to said conveyor.

2. Apparatus for feeding materials at a regulated rate, comprising a moving conveyor, means responsive to variations in the weight of material on the conveyor for producing first signals bearing a preselected relation to the instantaneous weight of materials on the conveyor, means responsive to the linear velocity of the conveyor for producing second signals representative of the instantaneous linear velocity of the conveyor, means for generating third signals continuously representing selected instantaneous material output values, multiplying means responsive to said first signals and second signals for generating output signals representing the product of the instantaneous values of said first signals and second signals, subtracting means responsive to the signals generated by said multiplying means and to said third signals for generating difference signals representing the difference between the same, amplifier means responsive to said difference signals for producing a first control signal, integrating means responsive to said difference signals for integrating the same with respect to time, multiplier means responsive to output signals from said integrating means for multiplying the same by a constant factor and generating a second control signal responsive thereto, regulating means for varying the rate of supply of said materials to said conveyor, and means responsive to said first and second control signals for adding the same and producing signals representing the sum of said first and second control signals for controlling said regulating means.

3. Apparatus for feeding materials at a regulated rate, comprising a conveyor movable in a first direction for transporting materials and in a second direction responsive to the weight of materials thereon, weighing means responsive to movement of said conveyor in said second direction for continuously producing first signals representing the instantaneous force of the conveyor on said weighing means, means responsive to the linear velocity of the conveyor for continuously producing second signals representative of the instantaneous linear velocity of the conveyor, means for generating third signals continuously representing selected values of instantaneous material output values, multiplying means responsive to said first signals and second signals for generating output signals representing the product of the instantaneous values of said first signals and second signals, subtracting means responsive to the signal generated by said multiplying means and to said third signals for generating difference signals representing the difference between the same, amplifier means responsive to said difference signals for producing a first control signal, integrating means responsive to said difference signals for integrating the same with respect to time, multiplier means responsive to output signals from said integrating means for multiplying the same by a constant factor and generating a second control signal responsive thereto, regulating means for varying the rate of supply of said materials to said conveyor, and means responsive to said first and second control signals for adding the same and producing signals representing the sum of said first and second control signals for controlling said regulating means.

4. Apparatus for feeding pulverulent or granular materials at a regulated rate comprising a supply source for said materials, an endless conveyor, extractor means for transferring materials from said supply source to said endless conveyor, means for driving said endless conveyor, means supporting said endless conveyor for movement as a unit about a stationary axis, a weighing device coupled to said endless conveyor to respond to variations in the weight of material on said conveyor, means for measuring the instantaneous forces applied by the conveyor to the weighing device and producing first output signals representative of the same, means for measuring the instantaneous forward velocity of the conveyor and generating second signals representing the same, means for generating third signals continuously representing selected instantaneous material output values, regulating means coupled with said extractor for varying the rate of delivery of the material from said supply source to said conveyor, multiplying means responsive to said first and second signals for generating output signals representing the product of instantaneous values of said first and second signals, subtracting means responsive to said output signals from said multiplying means and to said third signals for generating difference signals representing the algebraic difference between instantaneous values of the same, amplifier means for amplifying said difference signals to produce a first control signal, integrating means responsive to said difference signal for integrating the same with respect to time and multiplying the integral thereof by a constant factor to produce a second control signal, regulating means coupled to said extractor for varying the rate of delivery of materials thereby to said conveyor, and means responsive to said first and second control signals for producing output signals representing a function of both said first and second control signals for controlling said regulating means.

References Cited in the file of this patent

UNITED STATES PATENTS

| | | |
|---|---|---|
| 1,125,705 | Messiter | Jan. 19, 1915 |
| 2,962,150 | Haley et al. | Nov. 29, 1960 |

FOREIGN PATENTS

| | | |
|---|---|---|
| 916,473 | Germany | Aug. 12, 1954 |